United States Patent
Delaney et al.

(10) Patent No.: US 11,036,375 B1
(45) Date of Patent: Jun. 15, 2021

(54) DYNAMIC ZOOM BASED ON MEDIA (71) Applicant: LENOVO (Singapore) PTE. LTD., New Tech Park (SG)

(72) Inventors: Mark Patrick Delaney, Raleigh, NC (US); John C. Mese, Cary, NC (US); Nathan J. Peterson, Oxford, NC (US); Russell S. VanBlon, Raleigh, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/796,631

(22) Filed: Feb. 20, 2020

(51) Int. Cl.
*G06F 3/0484* (2013.01)
*G06F 3/0488* (2013.01)

(52) U.S. Cl.
CPC ...... *G06F 3/04845* (2013.01); *G06F 3/04883* (2013.01)

(58) Field of Classification Search
CPC ............ G06F 3/04845; G06F 3/04883; G06F 2203/04806
See application file for complete search history.

(56) References Cited

U.S. PATENT DOCUMENTS

| | | | | |
|---|---|---|---|---|
| 5,528,289 | A * | 6/1996 | Cortjens | H04N 5/23203 348/14.05 |
| 6,704,034 | B1 * | 3/2004 | Rodriguez | G06F 40/103 715/860 |
| 9,170,728 | B2 * | 10/2015 | Liang | G06F 3/0488 |
| 10,061,507 | B2 * | 8/2018 | Fleizach | G06F 3/048 |
| 10,222,975 | B2 * | 3/2019 | Bart | G06F 3/04883 |
| 2009/0160793 | A1 * | 6/2009 | Rekimoto | G06F 3/0485 345/173 |
| 2010/0156806 | A1 * | 6/2010 | Stallings | G06F 3/04883 345/173 |
| 2010/0259500 | A1 * | 10/2010 | Kennedy | G06F 3/0416 345/173 |
| 2010/0299641 | A1 * | 11/2010 | Cundill | G06F 3/04883 715/863 |
| 2010/0302281 | A1 * | 12/2010 | Kim | G06F 3/04845 345/661 |
| 2011/0007029 | A1 * | 1/2011 | Ben-David | G06F 3/04883 345/174 |
| 2011/0035702 | A1 * | 2/2011 | Williams | G06F 3/0481 715/800 |
| 2013/0100279 | A1 * | 4/2013 | Nordenfelt | H04N 5/232 348/135 |
| 2013/0111332 | A1 * | 5/2013 | Davis | G06F 3/0488 715/247 |
| 2013/0127765 | A1 * | 5/2013 | Behdasht | G06F 3/044 345/173 |
| 2013/0176344 | A1 * | 7/2013 | Mandic | G06F 3/04883 345/661 |

(Continued)

*Primary Examiner* — Dino Kujundzic
(74) *Attorney, Agent, or Firm* — Kunzler Bean & Adamson (57) ABSTRACT

For dynamic zoom based on media, a processor detects a zoom event. The zoom event includes a tap on a touch screen. The zoom event is located at a displayed media and includes a zoom location. The processor further determines a media profile for the zoom event. The processor calculates a zoom percentage based on the zoom event and the media profile. The processor further presents the displayed media resized by the zoom percentage on the touch screen.

16 Claims, 6 Drawing Sheets

(56) References Cited

U.S. PATENT DOCUMENTS

| | | | |
|---|---|---|---|
| 2013/0265237 A1* | 10/2013 | MirHosseinZadeh Sarabi | G06F 3/04883 345/173 |
| 2014/0062917 A1* | 3/2014 | Seo | G06F 3/04883 345/173 |
| 2014/0198056 A1* | 7/2014 | Kolehmainmen | G06F 3/04883 345/173 |
| 2015/0262330 A1* | 9/2015 | Murakami | G06F 3/147 345/661 |
| 2015/0309709 A1* | 10/2015 | Kulkarni | G06T 5/00 715/781 |
| 2016/0179756 A1* | 6/2016 | Nickolov | G06F 3/0484 715/273 |
| 2017/0220241 A1* | 8/2017 | Vangapalli | G06F 3/0482 |
| 2019/0018532 A1* | 1/2019 | Klein | G06F 3/04845 |

\* cited by examiner

303  Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.  303

DYNAMIC ZOOM BASED ON MEDIA

FIELD

The subject matter disclosed herein relates to a zoom and more particularly relates to a dynamic zoom based on media.

BACKGROUND

A user may initiate a zoom event to get a closer look at displayed media.

BRIEF SUMMARY

An apparatus for dynamic zoom based on media is disclosed. The apparatus includes a touch screen, a processor, and a memory that stores code executable by the processor. The processor detects a zoom event. The zoom event includes a tap on the touch screen. The zoom event is located at a displayed media and includes a zoom location. The processor further determines a media profile for the zoom event. The processor calculates a zoom percentage based on the zoom event and the media profile. The processor further presents the displayed media resized by the zoom percentage on the touch screen. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and/organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
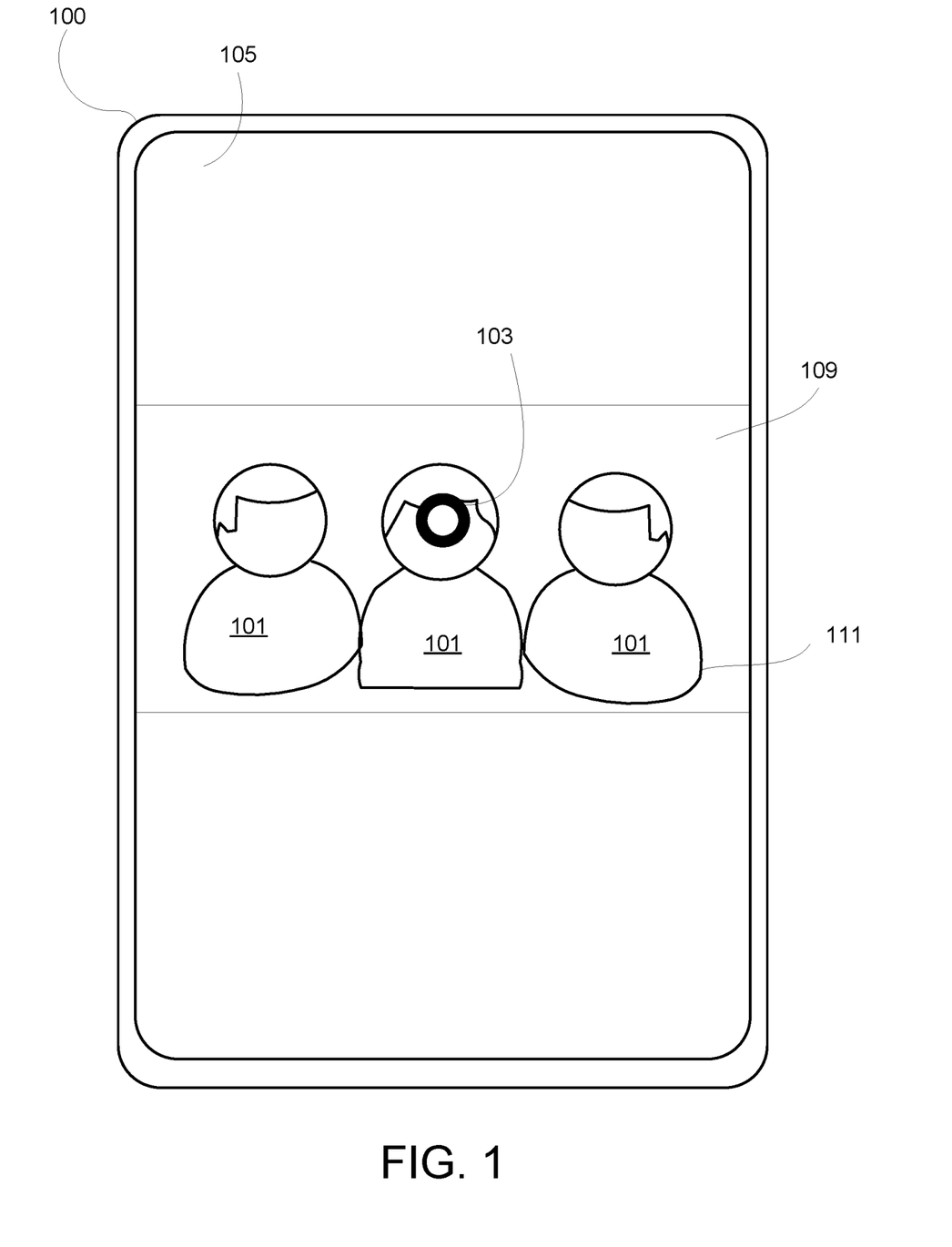
FIG. 1 is drawing illustrating one embodiment of an electronic device presenting displayed media.

FIG. 1 is drawing illustrating one embodiment of an electronic device 100 presenting displayed media 109. In the depicted embodiment, the electronic device 100 is a mobile telephone. In addition, the electronic device 100 may be a computer workstation, laptop computer, a tablet computer, a television, and information appliance, and the like. The electronic device 100 may include a touch screen 105. The touch screen 105 presents media as displayed media 109. The displayed media 109 may be an image, a video, text, a graphic illustration, or combinations thereof. In the depicted embodiment, the displayed media 109 shows a plurality of persons 101. The edge of the persons 101 may be a boundary 111.

A user may wish to view a portion of the displayed media 109 more closely. As a result, the user may initiate a zoom event. The zoom event may comprise a tap 103 on the touch screen 105. In the past, the electronic device 100 would zoom into the displayed media 109 in response to the zoom event. Typically, the electronic device 100 would zoom into the displayed media 109 by a fixed zoom percentage.

Unfortunately, by employing a fixed zoom percentage, the electronic device 100 may not present the view of the displayed media 109 desired by the user, requiring further adjustment of the displayed media 109. The embodiments determine a media profile for the zoom event and calculate a zoom percentage based on the zoom event and the media profile. The embodiments further present the displayed media 109 resized by the zoom percentage. As a result, the electronic device 100 presents the desired closer view of the displayed media 109 without further intervention by the user, improving the efficiency of the electronic device 100 in presenting the displayed media 109.

Figure 2:
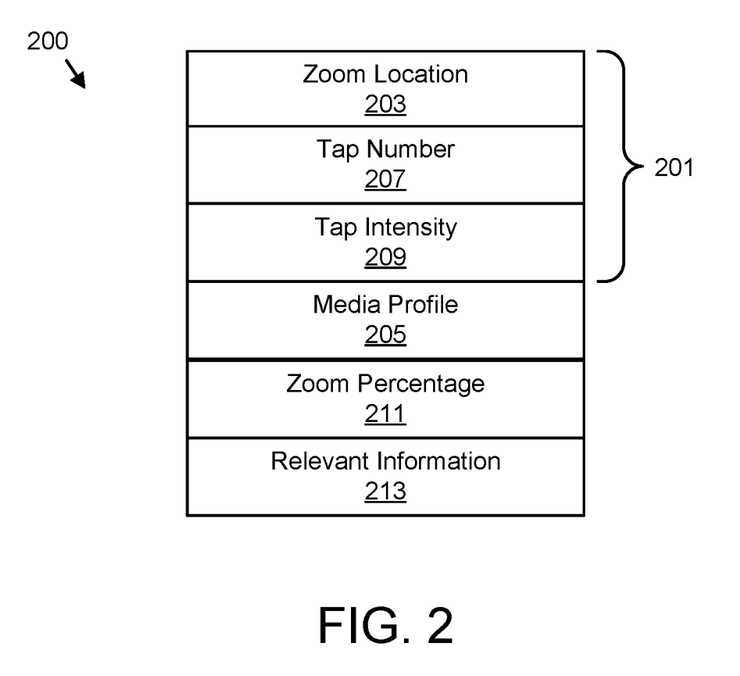
FIG. 2 is a schematic block diagram illustrating one embodiment of zoom data.

FIG. 2 is a schematic block diagram illustrating one embodiment of zoom data 200. The zoom data 200 may be used to calculate the zoom percentage 211 for a zoom event 201. The zoom data 200 may be organized as a data structure in a memory. In the depicted embodiment, the zoom data 200 includes a zoom location 203, the media profile 205, a tap number 207, a tap intensity 209, the zoom percentage 211, and relevant information 213. The zoom event 201 may comprise the zoom location 203, the tap number 207, and the tap intensity 209. In a certain embodiment, the zoom event 201 references the media profile 205.

The zoom location 203 may indicate where the tap 103 occurred on the touch screen 105. The tap number 207 may indicate a number of times the user tapped the touch screen 105 at the zoom location 203. The tap intensity 209 may indicate a force of each tap 103 on the touch screen 105 at the zoom location 203.

The media profile 205 may comprise an object detection. The object detection may indicate the identity of one or more objects. In a certain embodiment, the object detection indicates an outline of the object, an outline of a person, a face of a person, text, and the like. The object detection may further indicate the spatial relationship of objects.

In one embodiment, the media profile 205 comprises a scene composition. In addition, the media profile 205 may comprise a locus of the objects. In a certain embodiment, the media profile 205 describes a boundary 111 of the objects.

The relevant information 213 may be used to determine what portion of the original displayed media 109 is presented as the zoomed displayed media 109. In addition, the relevant information 213 may be used to modify the zoom percentage 211. For example, the relevant information 213 may be used to determine what portion of the original displayed image 109 is retained within the zoomed displayed image 109. In one embodiment, the relevant information 213 is selected from the group consisting of a face of person 101, an appearance of a person, an appearance of an object, an appearance of an animal, a border of text, and a border of an object.

For example, if the relevant information 213 is an object, the zoom percentage 211 may be calculated and/or modified so that the object at the zoom location 203 fills the zoomed displayed media 109. Similarly, if the relevant information 213 is a face of a person 101, the zoom percentage 211 may be calculated and/or modified so that the face of the person 101 at the zoom location 203 fills the zoomed displayed media 109. In another example, if the relevant information 213 is a person 101, the zoom percentage 211 may be calculated and/or modified so that the person 101 at the zoom location 203 fills the zoomed displayed media 109.

The zoom percentage 211 is calculated based on the zoom event 201 and/or the media profile 205. The zoom percentage 211 may also be modified to keep the relevant information 213 within the displayed media 209. For example, if the relevant information 213 is a face, all of the face with be presented in the displayed media 109 and no portion of the face will be clipped.

Figure 3A:
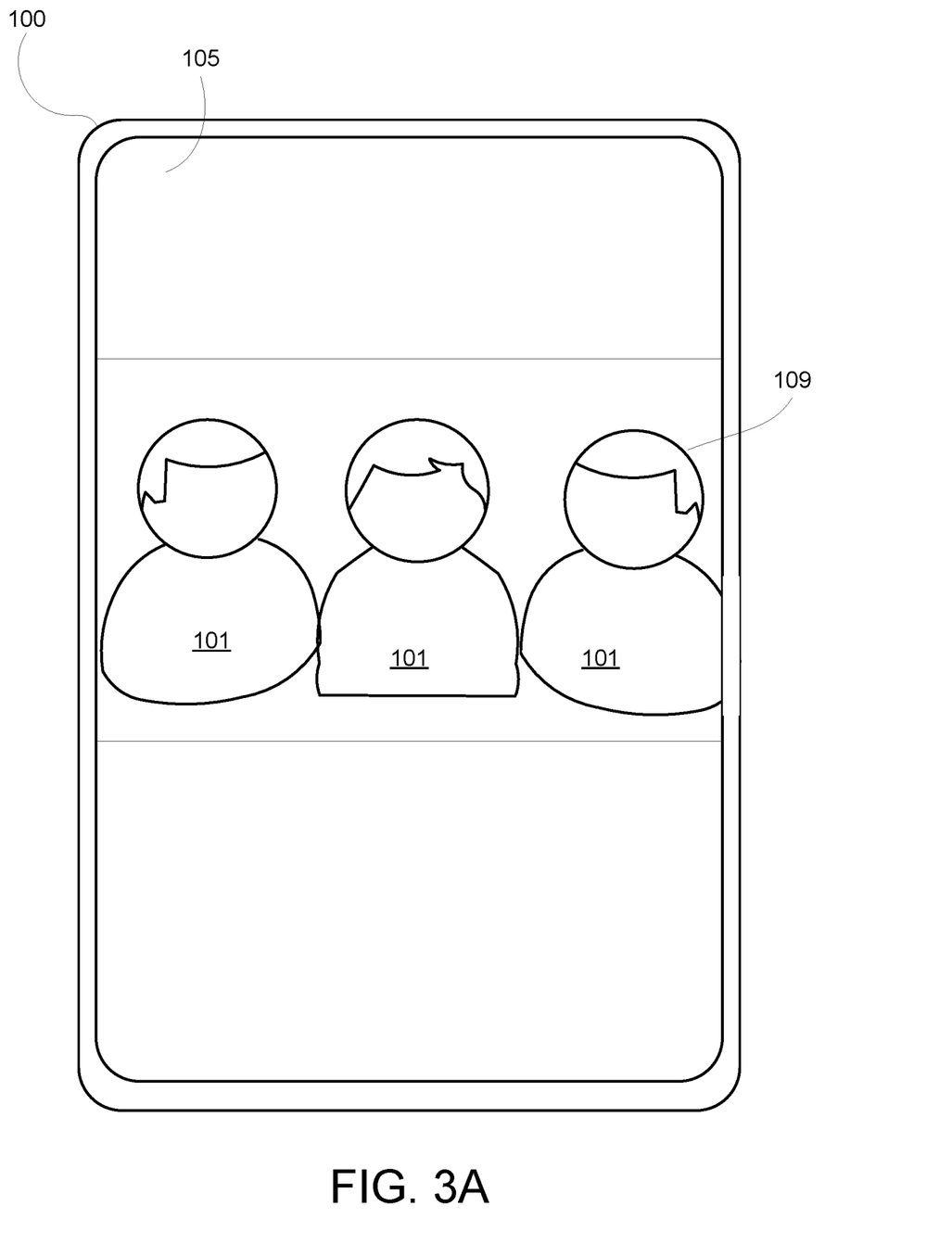
FIG. 3A is a drawing illustrating one embodiment of an electronic device presenting displayed media resized by a zoom percentage.

FIG. 3A is a drawing illustrating one embodiment of an electronic device 100 presenting displayed media 109 resized by a zoom percentage 211. In the depicted embodiment, the zoom percentage 211 is calculated so that the face of each person 101 is presented within the displayed image 109. However, a portion of one person 101 is clipped from the displayed image 109. Thus, the zoom percentage 211 extends beyond a boundary of the persons 101, and a portion of one person is clipped.

Figure 3B:
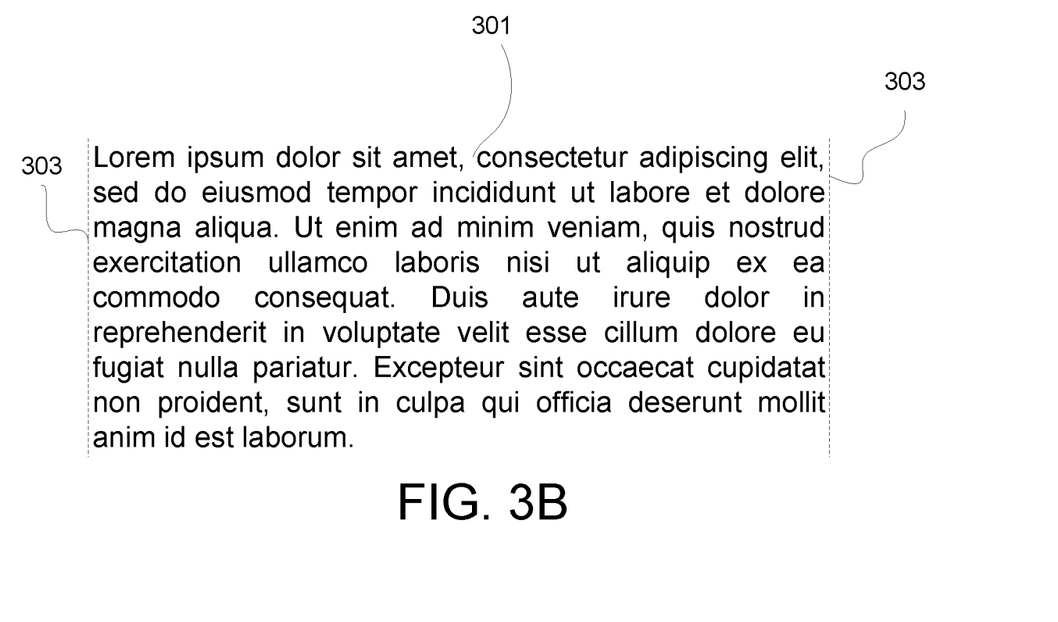
FIG. 3B is a text drawing illustrating one embodiment of text with borders.

FIG. 3B is a text drawing illustrating one embodiment of text 301 with borders 303. In the depicted embodiment, the text 301 is shown with borders 303. In one embodiment, the zoom percentage 211 is calculated and/or modified so that all the text 301 is within the borders 303 as shown.

Figure 3C:
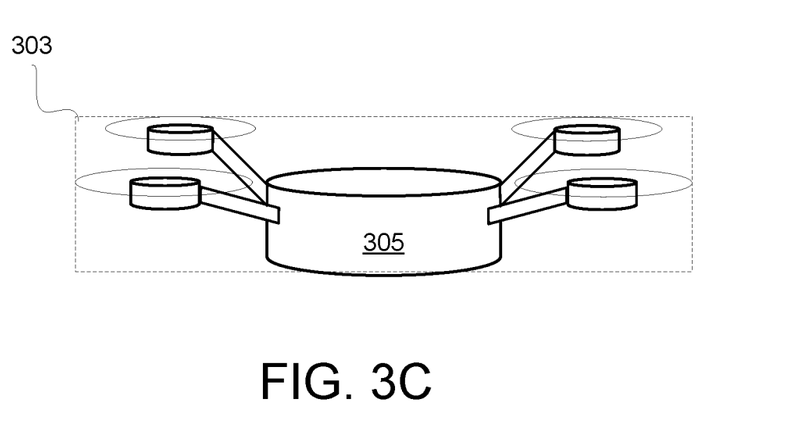
FIG. 3C is a perspective drawing illustrating one embodiment of an object with borders.

FIG. 3C is a perspective drawing illustrating one embodiment of an object 305 with borders 303. In the depicted embodiment, the object 305 is shown bounded by the borders 303. In one embodiment, the zoom percentage 211 is calculated and/or modified so that all of the object 305 within the borders 303 is shown.

Figure 4:
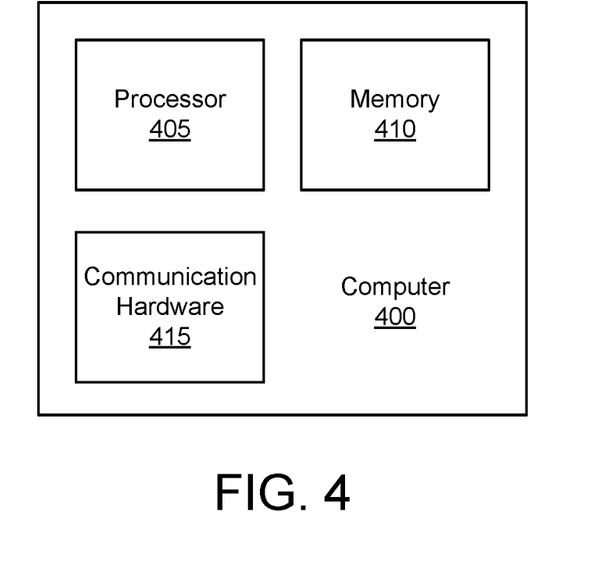
FIG. 4 is a schematic block diagram illustrating one embodiment of a computer.

FIG. 4 is a schematic block diagram illustrating one embodiment of a computer 400. The computer 400 may be embodied within the electronic device 100. In the depicted embodiment, the computer 400 includes a processor 405, a memory 410, and communication hardware 415. The memory 410 may comprise a semiconductor storage device, a hard disk drive, an optical storage device, or combinations thereof. The memory 410 may store code. The processor 405 may execute the code. The communication hardware 415 may communicate with other devices such as the touch screen 105.

Figure 5:
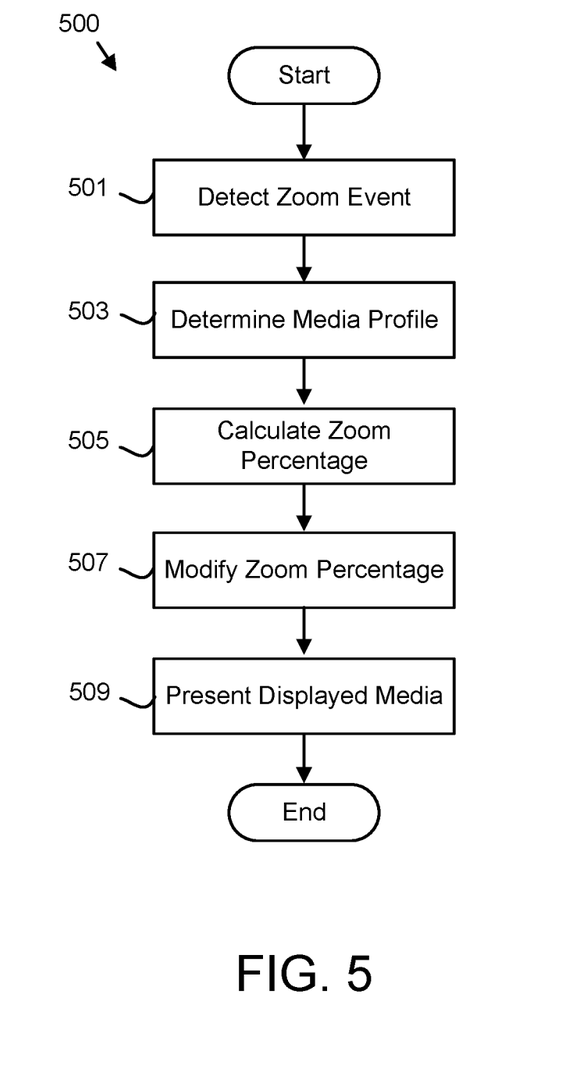
FIG. 5 is a schematic flow chart diagram illustrating one embodiment of a dynamic zoom method.

FIG. 5 is a schematic flow chart diagram illustrating one embodiment of a dynamic zoom method 500. The method 500 may calculate the zoom percentage 211 and present the displayed media 109 resized by the zoom percentage 211. The method 500 may be performed by the computer 400 and/or processor 405.

The method 500 starts, and in one embodiment, the processor 405 detects 501 the zoom event 201. The zoom event 201 may comprise one or more taps 103 on the touch screen 105. The zoom event 201 may be located at the displayed media 109 and comprise a zoom location 203.

The processor 405 may determine 503 the media profile 205 for the zoom event 201. In one embodiment, the media profile 205 is determined 503 by detecting one or more objects 305. In addition, the media profile 205 may be determined 503 by detecting one or more persons 101. The media profile 205 may further be determined 503 by detecting the faces of one or more persons 101. In a certain embodiment, the media profile 205 is determined 503 by detecting an appearance of a person 101. The media profile 205 may also be determined 503 from an appearance of an object 305. The media profile 205 may be determined 503 by detecting text 301. In addition, the media profile 205 may be determined 503 by detecting a border 303 of the text 301 and/or of the objects 305.

In one embodiment, the media profile 205 includes a boundary 111 of the objects 305, wherein each object 305 is included in the boundary 111. The media profile 205 may further include a locus of the objects 305. The locus may be calculated as an area center, a center of radii, and the like.

In a certain embodiment, the media profile 205 includes a scene composition. The scene composition may identify thematic elements of displayed media 109 including blank space, segments, and lines.

The processor 405 may calculate 505 the zoom percentage 211. The zoom percentage 211 may be calculated 505 based on the zoom event 201 and/or the media profile 205. In one embodiment, zoom percentage 211 is calculated based on the tap number 207. In a certain embodiment, a tap number 207 of two is associated with an increase zoom percentage 211 in the range of 35-65 percent. A tap number 207 of three may be associated with an increase zoom percentage 211 of 60-100 percent.

In a certain embodiment, the zoom percentage 211 is based on the tap intensity 209. A hard tap intensity 209 may be greater than a soft tap intensity 209 by an intensity threshold in the range of 80 to 150 percent. In one embodiment, an increase zoom percentage 211 in the range of 35-65 percent is associated with the soft tap intensity 209. An increase zoom percentage 211 of 60-100 percent may be associated with the hard tap intensity 209.

In one embodiment, the zoom percentage 211 is calculated based on the boundary 111 of the objects 305. For example, the zoom percentage 211 may increase size of the displayed media 109 up to the boundary 111 of the objects 305. In addition, the zoom percentage 211 may be calculated based on a border 303. For example, the zoom percentage 211 may increase the size of the displayed media 109 up to one or more borders 303.

In one embodiment, the processor 405 modifies 507 the zoom percentage 211. The zoom percentage 211 may be modified 507 to keep the relevant information 213 within the displayed media 109. In addition, the zoom percentage 211 may be modified 507 so that a detected object 305, a detected person 101, and/or a face of the detected person 101 at the zoom location 203 fills the displayed media 109. For example, the zoom percentage 211 may be modified 507 so that a single face from the tap 103 is presented as the displayed image 109. In addition, the zoom percentage 211 may be modified 507 so that a single object 305 from the tap 103 is presented as the displayed image 109.

In one embodiment, the zoom percentage 211 is modified 507 so that the object 305, the detected person 101, and/or the face of the detected person 101 is not distorted. The object 305, the detected person 101, and/or the face of the detected person 101 may be distorted if pixels boundaries are distinctly visible.

The zoom percentage 211 may be modified 507 to preserve a boundary 111 and/or border 303. For example, the zoom percentage 211 may be modified 507 so that no portion of the displayed media 109 is clipped. In one embodiment, the zoom percentage 211 is modified to preserve the scene composition. For example, the zoom percentage 211 may be modified to preserve blank space.

The processor 405 may further present 509 the displayed media 109 resized to the zoom percentage 211 and the method 500 ends. As a result, the displayed media 109 is intelligently resized based on the zoom event 201, the media profile 205, and/or the relevant information 213.

The embodiments detect the media event 201 and determine a media profile 205 for the media event 201. In addition, the embodiments calculate the zoom percentage 211 based on the zoom event 201 and the media profile 205. The embodiments may further modify the zoom percentage 211 based on the relevant information 213. As a result, when the assumed displayed media 109 is presented by the touch screen 105, the zoomed displayed media 109 is appropriate for the zoom event 201, the media profile 205, and/or the relevant information 213. Thus, the zoomed displayed media 109 may be satisfactorily presented without additional modifications, improving the efficiency of the electronic device 100 and/or computer 400, and the usefulness of the electronic device 100 and/or computer 400 to the user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a touch screen;
a processor;
a memory that stores code executable by the processor to:
detect a zoom event comprising a tap and a tap number on the touch screen, wherein the zoom event is located at a displayed media and comprises a zoom location at the tap and the tap number is a number of consecutive times the touch screen is tapped at the zoom location;
determine a media profile for the zoom event;
calculate a zoom percentage based on the zoom event and the media profile, wherein a tap number of two results in an increase zoom percentage in the range of 35-65 percent based on the media profile and a tap number of three results an increase zoom percentage of 60-100 percent based on the media profile; and
present the displayed media resized by the zoom percentage on the touch screen.

2. The apparatus of claim 1, wherein the zoom percentage is modified to keep relevant information within the displayed media and the relevant information is selected from the group consisting of a face of person, an appearance of a person, an appearance of an object, an appearance of an animal, a border of text, and a border of an object.

3. The apparatus of claim 1, wherein the media profile comprises an object detection and the zoom percentage are modified so that a detected object, a detected person, and/or a face of the detected person at the zoom location fills the displayed media.

4. The apparatus of claim 3, wherein the zoom percentage is modified so that the object, the detected person, and/or the face of the detected person is not distorted.

5. The apparatus of claim 1, wherein the zoom event further comprises a tap intensity and the zoom percentage is based on the tap intensity.

6. The apparatus of claim 5, wherein a hard tap intensity is greater than a soft tap intensity by an intensity threshold in the range of 80-150 percent, an increase zoom percentage in the range of 35-65 percent is associated with the soft tap intensity, and an increase zoom percentage of 60-100 percent is associated with the hard tap intensity.

7. A method comprising:
detecting, by use of a processor, a zoom event comprising a tap and a tap number on a touch screen, wherein the zoom event is located at a displayed media and comprises a zoom location at the tap and the tap number is a number of consecutive times the touch screen is tapped at the zoom location;
determining a media profile for the zoom event;
calculating a zoom percentage based on the zoom event and the media profile, wherein a tap number of two results in an increase zoom percentage in the range of 35-65 percent based on the media profile and a tap number of three results an increase zoom percentage of 60-100 percent based on the media profile; and
presenting the displayed media resized by the zoom percentage on the touch screen.

8. The method of claim 7, wherein the zoom percentage is modified to keep relevant information within the displayed media and the relevant information is selected from the group consisting of a face of person, an appearance of a person, an appearance of an object, an appearance of an animal, a border of text, and a border of an object.

9. The method of claim 7, wherein the media profile comprises an object detection and the zoom percentage is modified so that a detected object, a detected person, and/or a face of the detected person at the zoom location fills the displayed media.

10. The method of claim 9, wherein the zoom percentage is modified so that the object, the detected person, and/or the face of the detected person is not distorted.

11. The method of claim 7, wherein the zoom event further comprises a tap intensity and the zoom percentage is based on the tap intensity.

12. The method of claim 11, wherein a hard tap intensity is greater than a soft tap intensity by an intensity threshold in the range of 80-150 percent, an increase zoom percentage in the range of 35-65 percent is associated with the soft tap intensity, and an increase zoom percentage of 60-100 percent is associated with the hard tap intensity.

13. A program product comprising a non-transitory computer readable storage medium that stores code executable by a processor, the executable code comprising code to:
  detect a zoom event comprising a tap and a tap number on a touch screen, wherein the zoom event is located at a displayed media and comprises a zoom location at the tap and the tap number is a number of consecutive times the touch screen is tapped at the zoom location;
  determine a media profile for the zoom event;
  calculate a zoom percentage based on the zoom event and the media profile, wherein a tap number of two results in an increase zoom percentage in the range of 35-65 percent based on the media profile and a tap number of three results an increase zoom percentage of 60-100 percent based on the media profile; and
  present the displayed media resized by the zoom percentage on the touch screen.

14. The program product of claim 13, wherein the zoom percentage is modified to keep relevant information within the displayed media and the relevant information is selected from the group consisting of a face of person, an appearance of a person, an appearance of an object, an appearance of an animal, a border of text, and a border of an object.

15. The program product of claim 13, wherein the media profile comprises an object detection and the zoom percentage is modified so that a detected object, a detected person, and/or a face of the detected person at the zoom location fills the displayed media.

16. The program product of claim 15, wherein the zoom percentage is modified so that the object, the detected person, and/or the face of the detected person is not distorted.

* * * * *